United States Patent
Haginaka et al.

(10) Patent No.: US 7,022,744 B2
(45) Date of Patent: Apr. 4, 2006

(54) ION EXCHANGER FOR LIPOPROTEINS SEPARATION AND LIPOPROTEINS SEPARATION METHOD USING THE SAME

(75) Inventors: Jun Haginaka, Kyoto (JP); Masaru Sano, Kanagawa (JP); Tsunehiko Kurata, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 3 days.

(21) Appl. No.: 10/410,398

(22) Filed: Apr. 10, 2003

(65) Prior Publication Data

US 2004/0019125 A1 Jan. 29, 2004

(30) Foreign Application Priority Data

Apr. 11, 2002 (JP) .................................... P.2002-109036
Jul. 3, 2002 (JP) .................................... P.2002-195178

(51) Int. Cl.
C08J 5/20 (2006.01)

(52) U.S. Cl. .............................. 521/34; 521/30; 521/31; 521/38; 521/28; 526/273; 526/319; 526/320; 530/416; 530/830; 436/71

(58) Field of Classification Search .................. 521/28, 521/30, 31, 34, 38, 37, 54, 56, 58; 526/319, 526/320, 201; 530/416, 830; 436/71; 525/301, 525/302

See application file for complete search history.

(56) References Cited

U.S. PATENT DOCUMENTS

| | | | | | |
|---|---|---|---|---|---|
| 4,096,136 A | * | 6/1978 | Ayers et al. | ................. | 530/359 |
| 4,419,245 A | * | 12/1983 | Barrett et al. | ................. | 210/681 |
| 4,582,859 A | * | 4/1986 | Lein et al. | ..................... | 521/56 |
| 5,292,818 A | * | 3/1994 | Oishi et al. | .................. | 525/301 |
| 5,637,627 A | * | 6/1997 | Watanabe et al. | ............. | 521/33 |

FOREIGN PATENT DOCUMENTS

| | | |
|---|---|---|
| EP | 0 502 619 * | 2/1992 |
| JP | 7-088366 | 4/1995 |
| JP | 7-171389 | 7/1995 |
| JP | 07330818 * | 12/1995 |
| JP | 8-320313 | 12/1996 |
| JP | 9-015225 | 1/1997 |
| JP | 11179218 * | 12/1997 |
| JP | 11-180996 | 7/1999 |
| JP | 2000-319293 | 11/2000 |
| WO | WO 85/04885 * | 4/1985 |
| WO | 9-012629 | 1/1997 |

OTHER PUBLICATIONS

The 18th International Congress of Clinical Chemistry and Laboratory Medicine, Special Supplement, p. S 290, Oct. 20–25, 2002.

* cited by examiner

Primary Examiner—Tatyana Zalukaeva
(74) Attorney, Agent, or Firm—Oblon, Spivak, McClelland, Maier & Neustadt, P.C.

(57) ABSTRACT

A composition useful for separating lipoproteins, such as high density lipoprotein (HDL), low density lipoprotein (LDL), very low density lipoprotein (VLDL) and modified lipoproteins with a high degree of accuracy by ion-exchange based procedures. The composition comprises an organic particle having a hydrophilic surface onto which ion-exchange groups are introduced and which is formulated so as to provide a high enough degree of hydrophilicity to prevent irreversible absorption of lipoproteins, but which is not so high as to block the pores of the ion exchange particles and prevent adequate retention and separation of lipoproteins. A method for making a composition for separating lipoproteins comprising seed polymerization of organic particles, hydrophilic treatment of the organic particles by introducing 0.1–45% of a compound (B) having a cyclic ether group and/or a hydrophilic group and a polymerizable unsaturated double bond into organic polymer particles (A) by an addition reaction, and copolymerizing with the addition product of (A) and (B) 5–60% of a polymerizable vinyl monomer (C) having a cyclic ether group or/and a hydrophilic group to form particles (D) having a hydrophilic surface, and introducing an ion exchange group in an amount ranging from 0.15 milliequivalent or less per 1 g of dry particles (D).

20 Claims, 3 Drawing Sheets

ION EXCHANGER FOR LIPOPROTEINS SEPARATION AND LIPOPROTEINS SEPARATION METHOD USING THE SAME

FIELD OF THE INVENTION

This invention relates to an ion exchanger for lipoproteins separation and a lipoproteins separation method using the same. Particularly, the invention relates to an ion exchanger useful for separating high density lipoprotein (HDL), low density lipoprotein (LDL), very low-density lipoprotein (VLDL) and/or modified lipoproteins with a high accuracy and a method for separating lipoproteins and modified lipoproteins using the same.

BACKGROUND OF THE INVENTION

Lipids such as cholesterol, phospholipids, neutral fats (triglycerides) and the like are contained in blood, and determination of cholesterol among them is widely used as a screening test for arteriosclerosis, hepatic diseases, diabetes mellitus or transient lipid metabolism disorders. Cholesterol forms complexes with proteins, phospholipids, triglycerides and the like in blood and exists as lipoproteins. The lipoproteins include high density lipoprotein (HDL), low density lipoprotein (LDL), very low-density lipoprotein (VLDL) and modified lipoproteins and the like, and analysis of each lipoprotein is useful for clinical diagnoses.

Several methods have been proposed as the method for separating lipoproteins by high performance liquid chromatography techniques. For example, JP-A-9-15225 describes a gel filtration method for carrying out separation based on molecular sizes, but this method has problems in that it requires a prolonged period of time for separation and a precise separation cannot be made due to the presence of many overlapping parts of lipoprotein peaks. (The term "JP-A" as used herein moans an "unexamined published Japanese patent application".) On the other hand, a method by an ion exchange chromatography which uses an ion exchanger having a hydrophilic polymer layer covering the surface of porous particles and having functional groups substantially only on said polymer layer is proposed in JP-A-11-180996, but it has disadvantages in that elution of lipoproteins applied to the column is poor and durability of the column is poor. Also, according to the ion exchanger disclosed in JP-A-11-180996, the difference between sodium chloride concentration in the mobile phase at the time of the elution of high density lipoprotein (HDL) and sodium chloride concentration in said mobile phase at the time of the elution of low density lipoprotein (LDL) is small, so that separation of HDL and LDL is not sufficient and it therefore does not reach a level applicable to actual clinical diagnoses in view of analytical accuracy.

On the other hand, it has been revealed that existing amount of modified lipoproteins in blood plasma, particularly increasing degree of oxidized modified LDL (one form of modified LDL) in plasma formed from low density lipoprotein (LDL) by undergoing oxidation reaction in the living body, reflects morbid states more strongly. Accordingly, markedly useful information for clinical findings could be obtained if the increasing degree of oxidized modified LDL in plasma could be examined, but to date there are no analyzing methods which can calculate them accurately and broadly.

SUMMARY OF THE INVENTION

The invention provides an ion exchanger capable of separating lipoproteins and modified lipoproteins within a short period of time with high accuracy by high performance liquid chromatography and a method for separating lipoproteins and modified lipoproteins using the same, contemplates providing an ion exchanger for lipoproteins separation having no problems as described in the foregoing, and particularly contemplates providing an ion exchanger capable of separating high density lipoprotein (HDL), low density lipoprotein (LDL), very low-density lipoprotein VLDL and modified lipoproteins within a short period of time with a high accuracy and a method for separating said lipoproteins using said ion exchanger.

The present inventors have found as a result of intensive studies that an ion exchanger having superior ability in separating lipoproteins can be obtained from an ion exchanger in which the surface of porous particles is covered with a hydrophilic polymer layer, by forming the hydrophilic polymer layer through a specific graft copolymerization and controlling ion exchange capacity at a predetermined value or less, thereby reaching the invention.

In addition, it was found that in the case of separating lipoproteins using a high performance liquid chromatography by flowing a mobile phase into a column in a so-called stepwise mode or gradient mode, the specified ion exchanger has the ability to elute high density lipoprotein (HDL) and low density lipoprotein (LDL) respectively from the column when sodium chloride concentration in the mobile phase flowing into the column is within a specified concentration range, and thereby found that lipoproteins can be separated using a column packed with said ion exchanger.

That is, the ion exchanger as the first gist of the invention resides in an ion exchanger for lipoproteins separation, which is an ion exchanger obtained by introducing an ion exchange group into surface hydrophilic-treated porous organic polymer particles (D) prepared by subjecting the surface of porous organic polymer particles (A) to hydrophilic treatment, wherein said hydrophilic treatment is carried out by allowing porous organic polymer particles (A) to undergo addition reaction with a compound (B) having a cyclic ether group or/and a hydrophilic group and a polymerizable unsaturated double bond and then to undergo copolymerization with a polymerizable vinyl monomer (C) having a cyclic ether group or/and a hydrophilic group, and wherein the ion exchange capacity is 0.15 milliequivalent or less per 1 g of dry ion exchanger, introduced amount of the compound (B) is from 0.1 to 45% by weight based on the porous organic polymer particles (A), and copolymerized amount of the compound (C) is from 5 to 60% by weight based on the addition product obtained by allowing the porous organic polymer particles (A) to carry out addition reaction with the compound (B).

Another gist of the invention resides in a method for separating lipoproteins, characterized in that the aforementioned ion exchanger packed in a column is allowed to contact with a human or animal-derived solution containing lipoproteins, particularly high density lipoprotein (HDL), low density lipoprotein (LDL), very low-density lipoprotein (VLDL) and/or modified lipoproteins, and then the lipoproteins are eluted by passing the mobile phase through the column in a stepwise mode or gradient mode.

DESCRIPTION OF THE REFERENCE NUMERALS

Figure 1:
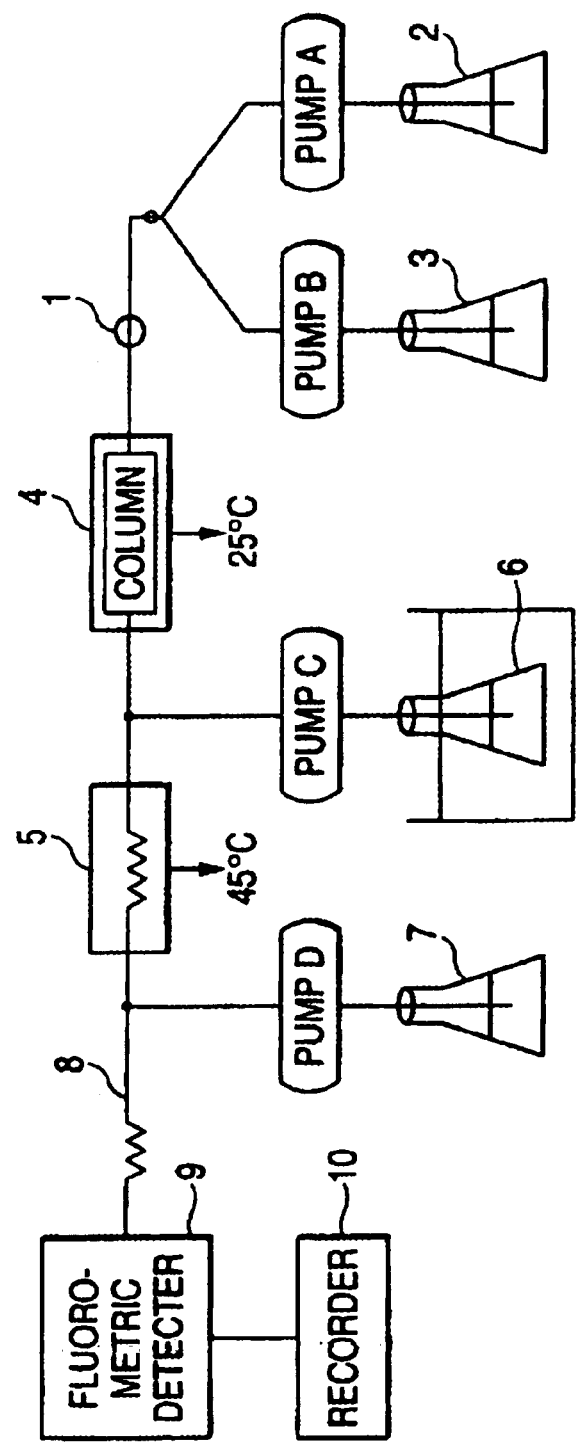
FIG. 1 is a schematic illustration showing a system of the lipoproteins separation test method in Test Example.

1: Automatic sampler
2: Storage tank of mobile phase A
3: Storage tank of mobile phase B
4: Packed column of the ion exchanger
5: Enzymatic reaction vessel A
6: Enzyme solution storage tank
7: NaOH aqueous solution storage tank
8: Fluorescence generation reaction vessel B
9: Fluorometric detector
10: Recorder

DETAILED DESCRIPTION OF THE INVENTION

The following describes the invention in detail.

The ion exchanger for lipoproteins separation of the invention is constituted by porous organic polymer particles having an ion exchange group and, in a high performance liquid chromatography using a column packed with said ion exchanger, it has a function to elute high density lipoprotein (HDL) and low density lipoprotein (LDL) respectively from the column when sodium chloride concentration in the mobile phase is within a specified concentration range as described in the foregoing, and this function is achieved when hydrophilic treatment of the surface of the porous organic polymer particles is carried out by a specified graft copolymerization and when the ion exchange capacity is within a specified range.

Though various methods can be considered for the production of the ion exchanger of the invention, for example, the following method can be use suitably. That is, firstly, polymer particles to be used as the base of the ion exchanger are produced making use of the so-called seed polymerization in which polymerization is carried out by swelling seed particles having a narrow particle diameter distribution with a vinyl monomer having a hydrophilic group. Porous polymer particles are produced by allowing a porosity forming agent to be present at the time of this seed polymerization. An ion exchanger can be easily obtained by subsequently subjecting the surface of the thus obtained particles to a hydrophilic treatment and introducing an ion exchange group into them. The seed polymerization method is described herein as an example of the preferred ion exchanger production method of the invention.

<Production of Seed Particles>

In the seed polymerization, organic polymer particles to be used as the seed particles can be produced by generally known granulation polymerization such as emulsion polymerization, soap-free emulsion polymerization, dispersion polymerization, suspension polymerization or the like. Particularly, polymer particles obtained by emulsion polymerization, soap-free emulsion polymerization or dispersion polymerization have narrower particle diameter distribution than that of those which are produced by suspension polymerization and therefore are desirable as seed particles.

Preferred as the polymer particles to be used as seed particles are a polymer comprising an aromatic monovinyl monomer and/or an aliphatic monovinyl monomer. These may be either a homopolymer or a copolymer of two or more monomers, or may be a copolymer with 1% by weight or less of a crosslinking polyvinyl monomer. Typically, particles comprising polystyrene or a polymethacrylic acid ester are desirable. Size of the particles can be optionally selected within the range of generally from 0.1 to 1,000 µm depending on the purpose.

<Seed Polymerization>

The seed particles comprising organic polymer particles thus produced in the aforementioned manner are impregnated with a crosslinking polyvinyl monomer containing from 0 to 90% by weight of a monovinyl monomer. The monovinyl monomer is preferably from 40 to 90% by weight, particularly preferably from 60 to 90% by weight. At lease one of the monovinyl monomer and polyvinyl monomer has a functional group for introducing a compound (B) having a cyclic ether group and a polymerizable unsaturated double bond, which will be described later, into the particle surface. Said functional group is generally a hydrophilic group such as hydroxy group.

An aromatic polyvinyl monomer or an aliphatic polyvinyl monomer is desirable as said crosslinking polyvinyl monomer, wherein divinylbenzene or bisphenylalkane is desirable as the aromatic polyvinyl monomer, and poly(meth)acrylate of a polyhydric alcohol or an alkylene poly(meth)acrylamide as the aliphatic polyvinyl monomer. Its illustrative examples include ethylene glycol di(meth)acrylate, polyethylene glycol di(meth)acrylate, glycerol di(meth)acrylate, allyl (meth)acrylate, trimethylolpropane tri(meth)acrylate, tetrahydroxybutane di(meth)acrylate, pentaerythritol di(meth)acrylate, methylene bisacrylamide, piperazine diacrylamide, diallyltartardiamide and the like, which may be used alone or as a mixture but ethylene glycol di(meth)acrylate is particularly desirable.

A monovinyl monomer is used as a vinyl monomer other than the crosslinking polyvinyl monomer. Examples of said monovinyl monomer include a (meth)acrylic acid polyhydric alcohol ester having one or more hydroxy groups, such as glycerol mono(meth)acrylate, 2-hydroxyethyl (meth)acrylate or the like, an N-substituted (meth)acrylamide such as N-isopropylacrylamide or the like, acrylamide, methacrylamide, glycidyl (meth)acrylate and the like or mixtures thereof. Particularly a hydrophilic vinyl monomer is suitable for which is easily distributed in an aqueous medium than in an organic solvent as the porosity forming agent to be used at the time of seed polymerization, and glycerol mono(meth)acrylate, glycidyl (meth)acrylate or a mixture thereof is desirable.

Kinds and amounts of these monovinyl monomers and polyvinyl monomers are optionally determined by taking size of the seed particles to be used and size of the particles of interest into consideration. Amount of the crosslinking polyvinyl monomer in the vinyl monomer to be improved into seed particles is generally from 10 to 100% by weight, preferably from 10 to 60% by weight, more preferably from 10 to 40% by weight.

In addition, according to the invention, it is desirable to carry out the seed polymerization in the presence of a porosity forming agent in order to improve characteristics of the porous crosslinked polymer particles. The porosity forming agent for this purpose, namely a porosity forming solvent to be impregnated into the seed particles, is an organic solvent which accelerates porosity formation of particles by acting as a phase separation agent at the time of seed polymerization, such as aliphatic and aromatic hydrocarbons, esters, ketones, ethers and alcohols. Examples of such solvents include toluene, xylene, cyclohexane, octane, butyl acetate, dibutyl phthalate, methyl ethyl ketone, dibutyl ether, 1-hexanol, 2-octanol, decanol, lauryl alcohol, cyclohexanol and the like, which can be used alone or as a mixture. Also, in some cases, desired characteristics can also be added to the crosslinked copolymer particles by selecting kinds of the porosity forming solvents, for example by whether they are aromatic hydrocarbons or alcohols.

As the radical polymerization initiator at the time of seed polymerization, generally used ones can be used, and their preferred examples include peroxide-based initiators (e.g., benzoyl peroxide, butyl peroxyhexanoate and the like) and azo base initiators (e.g., azobisisobutyronitrile, azobisisovaleronitrile and the like). These polymerization initiators are dissolved in a vinyl monomer or a porosity forming agent and impregnated into seed particles simultaneously with swelling of the vinyl monomer or before or after thereof. In addition, when seed particles are swelled with these vinyl monomer, porosity forming solvent, radical polymerization initiator and the like, the swelling can also be undergone by diluting them with a solvent having high affinity for the seed particles as occasion demands. Examples of such a solvent include water-miscible solvents (e.g., an alcohol, acetone and the like) and alkylhalides (e.g., dichloroethane, methylene chloride and the like). For initiating the seed polymerization, these swelling enhancing solvents may be evaporated under a reduced pressure before temperature is increased to the polymerization temperature.

According to the invention, preferably the seed particles are swelled by impregnating with the vinyl monomer, porosity forming solvent and polymerization initiator as describe in the foregoing and then polymerization is carried out by suspending them in an aqueous medium. In order to increase their dispersion stability preventing from aggregation, deformation and fusion during the seed polymerization, it is desirable to include a dispersion stabilizer in said aqueous medium. Preferred as said dispersion stabilizer includes known anionic and nonionic surface active agents and polyvinylpyrrolidone, polyethyleneimine, a vinyl alcohol/ethyl acetate copolymer and the like. The seed polymerization is started by rising temperature to the polymerization temperature. This polymerization temperature is preferably from 50° C. to 80° C., though it varies depending on the kind of polymerization initiator to be used. Also, polymerization period of the seed polymerization is preferably almost the same as the half-life of the polymerization initiator or longer than that, for example, a period of from 3 hours to 48 hours is desirable.

The seed polymerization according to the invention can be carried out also by other well known general methods. For example, when a polymer of from 0.1 to 1.5 µm produced by emulsion polymerization or soap-free emulsion polymerization is used as seed particles, a method which can produce porous particles having a uniform particle diameter of up to about 100 µm by firstly effecting primary swelling by swelling auxiliary such as dimethyl phthalate or the like and then carrying out seed polymerization (J. Ugelstad et al., *Makro-molekulare Chemie*, 80, 737 (1979)) can be suitably used. Also a method can be suitably used in which seed polymerization is carried out using polymer particles of from 1 to 10 µm produced by dispersion polymerization as seed particles (e.g., JP-A-64-26617). And after completion of the seed polymerization, a method for obtaining a base material for an ion exchanger having a desired porosity can be employed in which the formed crosslinked polymer particles is washed using a good solvent for the organic polymer particles used as the seed particles and then removing a part or entire portion of the polymer originated from the seed particles.

In the above manner, the porous organic polymer particles (A) which is the base material for ion exchanger can be obtained. It is desirable that the thus obtained porous organic polymer particles (A) are water-insoluble hydrophilic porous particles. In addition, it is desirable that the porous organic polymer particles (A) contain from 0 to 90% by weight of a unit derived from a monovinyl monomer and from 10 to 100% by weight of a unit derived from a crosslinking polyvinyl monomer and that at least one of the unit derived from a monovinyl monomer and the unit derived from a crosslinking polyvinyl monomer has a hydrophilic group.

As a preferred porosity of the thus obtained porous organic polymer particles (A) under dry condition, it is from 1 to 200 nm, preferably from 1 to 180 nm, more preferably from 7.5 to 150 nm, as the average pore diameter. Also, it is from 0.2 to 1.8 ml/g, preferably from 0.4 to 1.2 ml/g, as the pore volume and from 1 to 1,000 $m^2/g$, preferably from 5 to 500 $m^2/g$, as the specific surface area. The average pore diameter and the pore volume are measured by a mercury penetration method, and the specific surface area is measured by a nitrogen adsorption method.

<Reaction for Making Hydrophilic Surface>

An ion exchanger obtained by merely introducing an ion exchange group into the porous organic polymer particles (A) obtained in the above manner (e.g., JP-A-9-12629) can hardly withstand its practical use, because lipoproteins undergo irreversible adsorption to the ion exchanger. It is considered to be due to strong hydrophobic nature of lipoproteins which, therefore, cause hydrophobic adsorption to hydrophobic parts existing in the ion exchanger. Accordingly, a method in which the surface of porous organic polymer particles (A) is made into hydrophilic and then an ion exchange group is introduced is effective for achieving the object of the invention to separate lipoproteins with high accuracy. As the method for making hydrophilic, for example, the method described in JP-A-7-88366 can be used suitably. That is, the hydrophilic-surface porous organic polymer particles (D) which can be used suitably for the purpose of the invention are obtained by adding a compound (B) having a cyclic ether group and a polymerizable unsaturated double bond to the porous organic polymer particles (A) and then allowing said polymerizable unsaturated double bond to copolymerize with a polymerizable vinyl monomer (C). According to the invention, the surface of porous organic polymer particles (A) is made into hydrophilic with a compound (B) and a polymerizable vinyl monomer (C), using those having a cyclic ether group or/and a hydrophilic group as the compound (B) and polymerizable vinyl monomer (C). The invention is characterized in that introducing amount of the compound (B) and copolymerizing amount of the vinyl monomer (C) are set within specified ranges and the ion exchange capacity is also set within a specified range. By a combination of both of them, lipoproteins can be separated with a high accuracy.

Examples of the cyclic ether group which constitutes the compound (B) having a cyclic ether group or/and a hydrophilic group and a polymerizable unsaturated double bond include saturated cyclic monoethers which form a ring having from 2 to 6 carbon atoms (e.g., oxacyclopropyl group, 2-oxacyclobutyl group, 3-oxacyclobutyl group, 2-oxacyclopentyl group, 3-oxacyclopentyl group and the like), in which preferred ones are oxacyclopropyl group and 2-oxacyclopentyl group and particularly preferred is oxacyclopropyl group. Examples of the hydrophilic group which constitutes the compound (B) having a cyclic ether group or/and a hydrophilic group and a polymerizable unsaturated double bond include sulfone group, hydroxy group, carboxy group, carbonyl group, amino group, cyano group and the like. Also, vinyl group, allyl group, isopropenyl group can be exemplified as the functional group having a polymerizable double bond. Illustrative examples of the compound (B) comprised of them include 3,4-epoxy-1-butene, 4,5-epoxy-3-oxo-1-pentene, vinyl glycidyl ether, allyl glycidyl ether, glycidyl (meth)acrylate, tetrahydrofurfuryl (meth)acrylate and the like, of which allyl glycidyl ether, glycidyl (meth)acrylate and tetrahydrofurfuryl (meth)acrylate are preferable, and allyl glycidyl ether and glycidyl (meth)acrylate are particularly preferable.

Regarding the method for introducing the compound (B) to the surface of the porous organic polymer particles (A), addition reaction which uses an acid catalyst, an alkali catalyst and the like can be exemplified. Also, particularly in case that the reaction moiety capable of bonding to a cyclic ether group existing on the surface of the porous organic polymer particles (A) is a cyclic other group, two or more numbers of the compound (B) undergo ring opening polymerization with one cyclic ether group existing on the surface of the porous organic polymer particles (A) when ionic polymerization is carried out using a catalyst described below. Examples of the catalyst to be used in this ionic polymerization include protic acids such as sulfuric acid, phosphoric acid and the like and Lewis acids such as boron trifluoride, boron trifluoride diethyletherate, aluminium chloride, titanium tetrachloride and the like. The reaction is carried out in accordance with a known method in the presence or absence of solvent.

When a solvent is used, there is no particular limitation with the proviso that it is a compound which can dissolve the compound (B) to be added to the porous organic polymer particles (A). Concerning the porous organic polymer particles (A), either of a high affinity solvent which swells then or a low affinity solvent that does not swell them can be used, but lower affinity for the porous organic polymer particles (A) is generally desirable in view of the performance of the obtained ion exchanger. That is, the reason for this is that since addition reaction of the compound (B) occurs in more concentrated around the surface of said particles (A), the density of the added compound (B) around the surface becomes high. Examples of the solvent for the porous organic polymer particles (A) include broadly and generally used various organic solvents such as 1,2-dichloroethane, dioxane, tetrahydrofuran, toluene, cyclohexane and the like.

In case that the compound (B) has a cyclic ether group, the cyclic ether group of compound (B) is subjected to ring-opening in the usual way after introduction of the compound (B).

Amount of the compound (B) to be introduced into the porous organic polymer particles (A) is from 0.1 to 45% by weight based on the porous organic polymer particles (A) before the addition reaction, and the upper limit is preferably 35% by weight or less, more preferably 20% by weight or less, further preferably 18% by weight or less, and the lower limit is preferably 5% by weight or more, more preferably 10% by weight or more. In this connection, the introducing amount of compound (B) represents weight gain of the compound (B) after the addition reaction based on the weight of porous organic polymer particles (A) before the addition reaction. Too large amount of the introducing compound (B) causes hydrophobic adsorption of lipoproteins due to carbon chains of the compound (B) and therefore produces a reverse effect, and too small introducing amount causes insufficient degree of hydrophilic conversion of the surface of the ion exchanger. When the compound (B) has a cyclic ether group, the introducing amount of compound (B) into the porous organic polymer particles (A) represents introducing amount of compound (B) after ring-opening based on the porous organic polymer particles (A).

When two or more polymerizable unsaturated double bonds derived from this compound (B) are copolymerized with a polymerizable vinyl monomer (C) having a cyclic ether group or/and a hydrophilic group, the surface of porous organic polymer particles (A) is covered with a hydrophilic layer more certainly, and as a result, the thus obtained ion exchanger is able to inhibit irreversible adsorption of lipoproteins. Changes in the stretching of the polymer layer on the surface of the porous organic polymer particles (A), generated by an environmental change around the ion exchanger, can also be inhibited.

As the method for copolymerizing said polymerizable unsaturated double bonds in (B) with the polymerizable vinyl monomer (C) after adding the compound (B) to the porous organic polymer particles (A), radical polymerization, ionic polymerization, thermal polymerization, ultraviolet rays irradiation and the like are used, of which radical polymerization is particularly desirable. Examples of the polymerization initiator to be used in this case include azo initiators such as 2,2'-azobisisobutyronitrile, 2,2'-azobis(2,4-dimethylvaleronitrile), 4,4'-azobis(4-cyanopentanoic acid) and the like, peroxides initiators such as t-butyl hydroperoxide, di-t-butyl peroxide, benzoyl peroxide, di-isopropylperoxy dicarbonate, t-butylperoxy isobutyrate, hydrogen peroxide, potassium persulfate, ammonium persulfate and the like, or systems in which amine, sodium bisulfite and the like reducing agents are added thereto. The polymerization reaction is carried out in accordance with a conventionally known method, for example within the range of from 30 minutes to 24 hours at a temperature of from 0 to 100° C., if necessary using a solvent and the like.

Examples of the cyclic ether group which constitutes the vinyl monomer (C) having a cyclic ether group or/and a hydrophilic group include saturated cyclic monoethers which form a ring having from 2 to 6 carbon atoms such as oxacyclopropyl group, 2-oxacyclobutyl group, 3-oxacyclobutyl group, 2-oxacyclopentyl group, 3-oxacyclopentyl group and the like, of which preferred ones are oxacyclopropyl group and 2-oxacyclopentyl group and particularly preferred is oxacyclopropyl group.

Examples of the hydrophilic group which constitutes the polymerizable vinyl monomer (C) to be used in the invention having a cyclic ether group or/and a hydrophilic group include sulfone group, hydroxy group, carboxy group, carbonyl group, amino group, cyano group and the like.

As the polymerizable vinyl monomer (C) to be used in the invention having a cyclic ether group or/and a hydrophilic group, it can be selected from a broad range of compounds which can introduce necessary functional groups into the ion exchanger of interest. Its illustrative examples include unsaturated carboxylic acids such as (meth)acrylic acid, itaconic acid, maleic acid and the like; (meth)acrylic acid esters such as (meth)acrylic acid alkyl esters (e.g., methyl (meth) ethylate ethyl (meth)acrylate, hexyl (meth)acrylate, heptyl (meth)acrylate, dodecyl (meth)acrylate, octadecyl (meth) acrylate and the like), hydroxyethyl (meth)acrylate, hydroxypropyl (meth)acrylate, phenyl (meth)acrylate, 3-chloro-2-hydroxypropyl (meth)acrylate, 2-chloroethyl (meth)acrylate, glycidyl (meth)acrylate, 2,3-dihydroxypropyl (meth)acrylate, dimethylaminoethyl (meth)acrylate, diethylaminoethyl (meth)acrylate, (meth)acryloyloxyethyltrimethylammonium chloride, tetrahydrofurfuryl (meth)acrylate and the like; and (meth)acrylamide derivatives such as (meth)acrylamide, N,N-dimethyl (meth)acrylamide, N,N-dimethylaminopropyl (meth)acrylamide, (3-(methacryloylamino)propyl)trimethylammonium chloride, 2-acrylamido-2-methyl-1-propanesulfonate and the like.

Also, as other polymerizable vinyl monomer (C) having a cyclic ether group or/and a hydrophilic group, vinyl esters such as vinyl acetate, vinyl propionate and the like; allyl alcohol and esters thereof; allylamine derivatives such as allylamine, diallylamine, diallyldimethylammonium chloride and the like; vinylamine derivatives such as N-vinylformamide, N-vinylacetamide and the like; and other vinyl compounds such as (meth)acrylonitrile, acrolein, sodium vinylsulfonate, sodium allylsulfonate, sodium p-styrenesulfonate, vinyl pyrrolidone and the like can be exemplified. These polymerizable vinyl monomers can be used alone or as a mixture of two or more and may be the same species as the aforementioned compound (B).

According to the invention, a polymerizable vinyl monomer which does not have a cyclic other group and a hydrophilic group may be used jointly with the polymerizable vinyl monomer (C) having a cyclic ether group or/and a hydrophilic group, within such a range that it does not spoil the effect of the invention. Examples of the polymerizable vinyl monomer which does not have a hydrophilic group include styrenes and its alkyl or halogen substitution products such as styrene, methylstyrene, α-methylstyrene, chlorostyrene, chloromethylstyrene and the like; vinyl ethers such as methyl vinyl ether, ethyl vinyl ether, octadecyl vinyl ether and the like; allyl alcohol ethers; vinylpyridine and the like.

When the polymerizable vinyl monomer (C) has a cyclic ether group, the polymerizable vinyl monomer (C) is subjected to copolymerization and then ring-opening of the cyclic ether group of polymerizable vinyl monomer (C) is carried out in accordance with a conventional method.

Copolymerizing amount of the polymerizable vinyl monomer (C) is from 5 to 60% by weight based on the addition product obtained by carrying out addition reaction of the compound (B) with the porous organic polymer particles (A), and its upper limit is preferably 40% by weight or less, more preferably 30% by weight or less, further preferably 20% by weight or less, and the lower limit is preferably 10% by weight or more. In this connection, this copolymerizing amount represents weight gain by the polymerizable vinyl monomer (C) after copolymerization of the polymerizable vinyl monomer (C) based on the addition product obtained by carrying out addition reaction of the compound (B) with the porous organic polymer particles (A). When this amount is too small, surface hydrophilic degree of the resulting surface hydrophilic-treated porous organic polymer particles (D) becomes insufficient so that it becomes difficult to inhibit irreversible adsorption of lipoproteins and blood components to the ion exchanger. When this is too large on the other hand, pores of said porous polymer particles are blocked and retention of lipoproteins by the ion exchanger becomes insufficient, so that desired separation cannot be obtained and recovery yield of lipoproteins becomes low.

A preferred ion exchanger for lipoproteins separation according to the invention is one in which an anion exchange group is introduced to the surface hydrophilic-treated porous organic polymer particles (D) obtained by the aforementioned method. As the anion exchange group to be introduced, various amino groups including dialkylamino groups (e.g., dimethylaminoethyl group, diethylaminoethyl group and the like) various quaternary ammonium groups and the like can be exemplified. The method for introducing an anion exchange group into said surface hydrophilic-treated porous organic polymer particles (D) is carried out in accordance with a conventionally known method. For example, when a vinyl monomer which constitutes base particle (matrix) of the ion exchanger has epoxy group, its examples include a method in which the epoxy group is denatured through ring-opening by water, glycerol, ethylene glycol or the like, and an anion exchange group is introduced into the thus formed hydroxy group, and a method in which an anion exchange group is directly bonded to said epoxy group. Also, amount of the anion exchange group to be introduced is 0.15 milliequivalent or less per 1 g of dry ion exchanger weight, preferably less than 0.12 milliequivalent, more preferably less than 0.1 milliequivalent, further preferably 0.07 milliequivalent or less, and the lower limit is generally 0.001 milliequivalent or more, preferably 0.005 milliequivalent or more, more preferably 0.01 milliequivalent or more, and further preferably 0.02 milliequivalent or more. Too high ion exchange capacity causes a tendency to worsen elution of lipoproteins applied to the column, and lower one than the above range causes a tendency to increase elution time of lipoproteins too quickly. Adjustment of the amount of the anion exchange group to be introduced can be carried out by controlling amount of the reaction reagent of amino compound.

The ion exchanger for lipoproteins separation according to the invention may also be another one in which a cation exchange group is introduced to the surface hydrophilic-treated porous organic polymer particles (D). As the cation exchange group to be introduced, sulfonate group and the like can be exemplified. As the method for introducing a cation exchange group into the hydrophilic-treated porous organic polymer particles (D), a conventionally known method is used. In addition, regarding the amount of the cation exchange group to be introduced, it is the same as the introducing amount of anion exchange group.

In this connection, it is desirable to use, as the surface hydrophilic-treated porous organic polymer particles (D), those in which a polyhydric alcohol (e.g., glycerol or the like) is allowed to undergo the reaction simultaneously with the formation of hydroxy group through ring-opening of the cyclic ether group that constitutes the polymerizable vinyl monomer (C). In addition, those in which polyhydric alcohol (e.g., glycerol or the like) is allowed to react with a hydroxy group or the like that constitutes the polymerizable vinyl monomer (C) may also be used as the surface hydrophilic-treated porous organic polymer particles (D).

<Separation Method of Lipoproteins>

Lipoproteins can be separated with a high accuracy by a high performance liquid chromatography using the ion exchanger obtained by the aforementioned manner. That is, the ion exchanger for lipoproteins separation of the invention elutes lipoproteins when this is packed in a column, the ion exchanger packed in the column is allowed to contact with a solution containing lipoproteins, and then a mobile phase is flowed into the column in a stepwise mode or gradient mode, and it has a characteristic in that high density lipoprotein (HDL) is eluted from the column and detected as a peak when concentration of sodium chloride in the mobile phase flowing into the column is 0.13 mol/l or less, and low density lipoprotein (LDL) is eluted when concentration of sodium chloride in the mobile phase is 1.6 times or more, more preferably 1.7 times or more, than said concentration at the time of HDL elution.

In this connection, performance of the ion exchanger is specified by measuring under the liquid chromatographic operation conditions described in the test method which will be described later.

Though the method for packing the ion exchanger for lipoproteins separation of the invention into a column is not particularly limited, a packed column was obtained by a wet method in this case. Any material can be used as the column material, as long as it has sufficient mechanical strength as general columns for high performance liquid chromatography, such as those made of stainless steel, glass, polyether ether ketone (PEEK) and the like. Regarding dimensions of the column, a column having an inner diameter of from 1 to 10 mm and a length of from 20 to 100 mm can be used, but preferably, a packed column having a balance between the separation operation time and the column operation pressure can be obtained by the use of a column having an inner diameter of from 3 to 8 mm and a length of from 30 to 60 mm. Using this ion exchanger-packed column, lipoproteins are separated by high performance liquid chromatographic technique.

Though an isocratic method by a single mobile phase and a stepwise, gradient or the like which uses two or more mobile phases can be cited as the mobile phase flowing method in a high performance liquid chromatography, a stepwise mode or a gradient mode is suitably used for simultaneously separating a group of substances having greatly different properties in terms of their molecular size, strength of hydrophobicity, degree of dissociation and the like, such as the case of lipoproteins.

According to the invention, lipoproteins can be separated accurately and within a short period of time by employing a stepwise mode particularly two solutions (solution A and solution B) as the mobile phases. The separation can be carried out with good reproducibility by using a buffer solution in the mobile phase solution A. As the buffer solution in this case, buffer solutions generally used in separating proteins by ion exchange chromatography (e.g., phosphate buffer, Tris-HCl buffer, citrate buffer, phthalate buffer and the like) can also be used in the invention, of which phosphate buffer can be used most suitably. Concentration of the phosphate buffer which can be used is from 0.001 M to 0.1 M, but preferably from 0.001 M to 0.05 M. The buffer solution can be used within a pH range of from 2 to 12, but preferably 7 or more for separating lipoproteins by an anion exchange mode. As the solution B, an aqueous solution of an inorganic salt (e.g., sodium sulfate, ammonium sulfate, sodium chloride or the like) can be used, of which sodium chloride aqueous solution is most suitably used. The sodium chloride aqueous solution can be used at a concentration of from 0.01 M to 2 M, preferably from 0.1 M to 0.7 M. Since metal ions in the elution solution interferes with enzymatic reactions in the postcolumn reaction system, a chelating agent such as EDTA or the like may be added for masking metal ions.

FIG. 1 is a schematic illustration showing a system of the lipoproteins separation test method using a column packed with the ion exchanger for lipoproteins separation of the invention. In FIG. 1, 1 is an automatic sampler, 2 is a storage tank of mobile phase A, 3 is a storage tank of mobile phase B, 4 is a packed column of the ion exchanger. 5 is an enzymatic reaction vessel A, 6 is an enzyme solution storage tank, 7 is an NaOH aqueous solution storage tank, 8 is a fluorescence generation reaction vessel B, 9 is a fluorometric detector and 10 is a recorder. The separation operations are described with reference to FIG. 1.

Firstly, the solution A as the aforementioned mobile phase is flowed into the column by the pump A at a space velocity (SV) of 30/hr or more, while injecting a lipoproteins-containing solution (to be referred to as injection sample hereinafter) into the solution A via the automatic sampler (1) and introducing it into the aforementioned packed column (4). Thereafter, the mobile phase solution A flowing into the column and the solution B supplied by the pump B are mixed and flowed into the column by a stepwise mode in which a ratio of the solution B in the mobile phase is increased in stepwise manner at an interval of time determined in advance and at a ratio determined in advance, thereby separating lipoproteins by the liquid chromatography. It is desirable to keep temperature of the packed column (4) constantly between 20° C. and 40° C. during the operation.

Regarding the injection sample, plasma or serum obtained from blood of human or an animal is diluted 5 to 20 volumes using phosphate buffered saline (PBS) solution and introduced into the column in a volume of from 0.8% to 12% of the column volume. The mobile phase containing lipoproteins separated in the column is introduced into a post column reaction system as the eluate and detected. Various substances including proteins (e.g., albumin, globulin and the like) are contained in plasma and serum, and they are also transferred through the column and are contained in the mobile phase elute from the column (eluate). Even if an attempt is made to detect lipoproteins alone in the eluate containing such substances using a method frequently used as the detection methods in high performance liquid chromatography (e.g., UV absorptiometry, VIS absorptiometry, RI detection method and the like), it is substantially impossible to obtain a chromatogram of a lipoprotein of interest due to influence of the aforementioned impurities. Accordingly, in order to specifically detect lipoproteins, a post column reaction making use of enzymes which specifically react with cholesterol and cholesterol esters as constituting elements of lipoproteins can be used as an excellent method for attaining the object of the invention.

As such a method, the method described in Anion-exchange High-performance Liquid Chromatographic Assay of Plasma Lipoproteins (Jun Haginaka et al., *Analytical Biochemistry*, 232, 163–171 (1995)) can for example be used suitably. In this method, homovanillic acid is enzymatically converted into a fluorescent product by hydrogen peroxide which is quantitatively formed by the reaction of a lipoprotein constituting component cholesterol with an enzyme, and then the substance is detected by a fluorometric detector, so that it does not undergo influence of impurities.

In the post column reaction system, an enzyme solution in the enzyme solution storage tank (6) is supplied to the eluate from the packed column by a pump C at a flow rate of 0.5 ml/min, mixed in a mixer (not shown in the drawing) and then passed through the enzymatic reaction vessel A (5) which is kept at 45° C. The enzyme solution is prepared in advance by dissolving respectively predetermined amounts of cholesterol ester hydrase, cholesterol oxidase and polyoxidase as enzymes and homovanillic acid as a fluorescent reagent in sodium phosphate buffer (pH 7.0).

While passing through the enzymatic reaction vessel, cholesterol in lipoproteins in the eluate reacts with the enzymes to form hydrogen peroxide, and the thus formed hydrogen peroxide reacts with homovanillic acid in the enzyme solution.

The eluate passed through the enzymatic reaction vessel A is mixed in a mixer (not shown in the drawing) with 0.1 M NaOH aqueous solution which is supplied from the pump D at a flow rate of 0.5 ml/min, the mixture is then introduced into the fluorescence generation reaction vessel B (8), and while it passes through the vessel, a reaction mixture of hydrogen peroxide and homovanillic acid is changed to a fluorescent product. This fluorescent product is detected by the fluorometric detector (9) at an excitation wavelength of 325 nm and at an emission wavelength of 420 nm, and the data are recorded by the recorder (10).

According to the invention, lipoproteins in plasma and serum can be separated and detected with markedly good accuracy by using a specified ion exchanger, so that it is markedly useful in clinical diagnoses.

Next, the invention is described further illustratively based on examples, but the invention is not restricted by these examples unless departing from the gist thereof.

EXAMPLE 1

(1) Synthesis of Porous Organic Polymer Particles (A)

Porous organic polymer particles (4) having an average particle diameter of 5.7 µm, a pore volume of 0.63 ml/g, a mode pore radius of 60 nm and a specific surface area of 37 m$^2$/g were obtained by using polyglycidyl methacrylate seed particles having an average particle diameter of 2 µm and copolymerizing glycidyl methacrylate and ethylene glycol dimethacrylate (70:30 by weight ratio) by a seed polymerization method.

(2) Synthesis of Hydrophilic-Surface Porous Organic Polymer Particles (D)

A reactor equipped with a stirrer, a condenser, a thermometer and a nitrogen gas introducing tube was charged with 100.0 g of the porous organic polymer particles (A) obtained in the aforementioned (1) and then with 10.0 g of glycidyl methacrylate (compound (B)), 870.0 g of toluene and 1.13 g of boron trifluoride diethyl etherate, and the reaction was carried out at 30° C. for 3 hours. Particles after the reaction were washed with toluene, acetone and methanol in that order and then hydrolyzed by heating at a temperature of 50° C. for 5 hours in 1,000 g of 5% $H_2SO_4$ aqueous solution to carry out ring opening reaction of epoxy ring. After completion of the reaction, the polymer particles were collected by filtration, thoroughly washed with desalted water and then dried. Weight of the polymer particles obtained by adding glycidyl methacrylate (B) to the surface of porous organic polymer particles (A) was 114.0 g (14.0% by weight of compound (B) was added).

A reactor equipped with a stirrer, a condenser, a thermometer and a nitrogen gas introducing tube was charged with 45.0 g of the polymer particles obtained by adding glycidyl methacrylate (B) to the surface of porous organic polymer particles (A) and then with 9.0 g of glycidyl methacrylate [polymerizable vinyl monomer (C)], 0.18 g of 2,2'-azobisisobutyronitrile and 405.0 g of ethyl acetate as the solvent. After replacing the atmosphere in the reactor with nitrogen gas, 6 hours of polymerization was carried out at 70° C. in the atmosphere of nitrogen. After completion of the reaction, the polymer particles were collected by filtration, washed with ethyl acetate, acetone and methanol in that order and then dried. Weight of the polymer particles obtained by adding glycidyl methacrylate (B) to the surface of the porous organic polymer particles (A) and further copolymerizing with the polymerizable vinyl monomer (C) was 51.2 g (13.8% by weight addition polymerization of compound (C)).

A 100 g portion of the polymer particles copolymerized with polymerizable vinyl monomer (C) was put into a reactor equipped with a stirrer, a condenser and a thermometer, and 400 ml of glycerol, 400 ml of ethylene glycol and 3.2 ml of 95% sulfuric acid were added thereto. Stirring was carried out in a 50° C. water bath for 6 hours. After the reaction, 800 ml of desalted water was added and then suction filtration was carried out to obtain the surface hydrophilic-treated porous organic polymer particles (D).

(3) Diethylaminoethylation Reaction

A 10 g portion of the surface hydrophilic-treated porous organic polymer particles (D) obtained by the surface addition reaction of the aforementioned (2) was put into a reactor equipped with a stirrer, a condenser and a thermometer, and 100 ml of 1.805 M NaOH aqueous solution was added thereto to effect impregnation of the particles. Next, 30.0 g of diethylaminoethyl chloride was added and allowed to undergo the reaction at 50° C. for 5 hours, thereby effecting introduction of diethylaminoethyl group. After completion of the reaction, the polymer particles were collected by filtration and washed with desalted water, 1 M HCl aqueous solution and desalted water in that order. Anion exchange capacity of the thus obtained polymer particles was 0.04 milliequivalent per 1 g dry weight.

EXAMPLE 2

Hydrophilic-surface porous organic polymer particles (D) was synthesized by the following reaction using polymer particles (14.0% by weight of compound (B) was added) obtained by adding glycidyl methacrylate (B) to the porous organic polymer particles (A) synthesized in Example 1 (average particle diameter 5.7 µm, specific surface area 37 m$^2$/g and mode pore radius 60 nm).

A reactor equipped with a stirrer, a condenser, a thermometer and a nitrogen gas introducing tube was charged with 25 g of the polymer particles (14.0% by weight of compound (B) was added) and then with 10.0 g of glycidyl methacrylate (polymerizable vinyl monomer (C)), 0.20 g of 2,2'-azobisisobutyronitrile and 225.0 g of ethyl acetate as the solvent. After replacing the atmosphere in the reactor with nitrogen gas, 6 hours of polymerization was carried out at 70° C. in the atmosphere of nitrogen. After completion of the reaction, the polymer particles were collected by filtration, washed with ethyl acetate, acetone and methanol in that order and then dried. Weight of the polymer particles obtained by adding glycidyl methacrylate (B) to the surface of the porous organic polymer particles (A) and further copolymerizing with the polymerizable vinyl monomer (C) was 31.4 g (25.7% by weight addition polymerization of compound (C)).

A 100 g portion of the polymer particles copolymerized with polymerizable vinyl monomer (C) was put into a reactor equipped with a stirrer, a condenser and a thermometer, and 400 ml of glycerol, 400 ml of ethylene glycol and 3.2 ml of 95% sulfuric acid were added thereto. Stirring was carried out in a 50° C. water bath for 6 hours. After the reaction, 800 ml of desalted water was added and then suction filtration was carried out to obtain the surface hydrophilic-treated porous organic polymer particles (D).

A 10.0 g portion of the thus obtained surface hydrophilic-treated porous organic polymer particles (D) was mixed with 100 ml of 1.805 M NaOH aqueous solution to effect impregnation of the particles therewith. Next, 30.0 g of diethylaminoethyl chloride was added and allowed to undergo the reaction at 50° C. for 5 hours, thereby effecting introduction of diethylaminoethyl group. After completion of the reaction, the polymer particles were collected by filtration and washed with desalted water, 1 M HCl aqueous solution and desalted water in that order. Anion exchange capacity of the thus obtained polymer particles was 0.09 milliequivalent per 1 g dry weight.

COMPARATIVE EXAMPLE 1

Introduction of ion exchange group was carried out by the following reaction using the surface hydrophilic-treated porous organic polymer particles (D) obtained by adding glycidyl methacrylate (compound (B)) to the porous organic polymer particles (A) obtained in Example 1 (14.0% by weight addition), further copolymerizing with glycidyl methacrylate, and then allowing the resulting polymer particles (13.8% by weight addition polymerization of polymerizable vinyl monomer (C)) to react with glycerol by the same method of Example 1.

In a reactor equipped with a stirrer, a condenser, a thermometer and a nitrogen gas introducing tube, 10.0 g of the polymer particles were impregnated with 100 ml of 2.00 M NaOH aqueous solution. Next, 30.0 g of diethylaminoethyl chloride was added and allowed to undergo the reaction at 50° C. for 5 hours, thereby effecting introduction of diethylaminoethyl group. After completion of the reaction, the polymer particles were collected by filtration and washed with desalted water, 1 M HCl aqueous solution and desalted water in that order. Anion exchange capacity of the thus obtained polymer particles was 0.33 milliequivalent per 1 g dry weight.

EXAMPLE 3

The following reaction was carried out using polymer particles (11.6% by weight of compound (B) was added) obtained by adding glycidyl methacrylate (compound B) to the porous organic polymer particles (A) synthesized in accordance with Example 1 (average particle diameter 5.3 μm, specific surface area 32 $m^2/g$ and mode pore radius 55 nm).

A reactor equipped with a stirrer, a condenser, a thermometer and a nitrogen gas introducing tube was charged with 20.0 g of the polymer particles (11.6% by weight of compound (B) was added) and then with 20.0 g of glycidyl methacrylate (polymerizable vinyl monomer (C)), 0.10 g of 2,2'-azobisisobutyronitrile and 72.0 g of ethyl acetate as the solvent. After replacing the atmosphere in the reactor with nitrogen gas, polymerization was carried out at 70° C. in the atmosphere of nitrogen for 6 hours. After completion of the reaction, the polymer particles were collected by filtration, washed with ethyl acetate, acetone and methanol in that order and then dried. Weight of the polymer particles obtained by adding glycidyl methacrylate (B) to the surface of the porous organic polymer particles (A) and further copolymerizing with the polymerizable vinyl monomer (C) was 29.3 g (46.4% by weight addition polymerization of compound (C)).

A 100 g portion of the polymer particles copolymerized with polymerizable vinyl monomer (C) was put into a reactor equipped with a stirrer, a condenser and a thermometer, and 400 ml of glycerol, 400 ml of ethylene glycol and 3.2 ml of 95% sulfuric acid were added thereto. Stirring was carried out in a 50° C. water bath for 6 hours. After the reaction, 800 ml of desalted water was added and then suction filtration was carried out to obtain surface hydrophilic-treated porous organic polymer particles (D).

A 10.0 g portion of the thus obtained surface hydrophilic-treated porous organic polymer particles (D) was mixed with 100 ml of 1.796 M NaOH aqueous solution to effect impregnation of the particles therewith. Next, 30.0 g of diethylaminoethyl chloride was added and allowed to undergo the reaction at 50° C. for 5 hours, thereby effecting introduction of diethylaminoethyl group. After completion of the reaction, the polymer particles were collected by filtration and washed with desalted water, 1 M HCl aqueous solution and desalted water in that order. Anion exchange capacity of the thus obtained polymer particles was 0.08 milliequivalent per 1 g dry weight.

TEST EXAMPLE

Separation of Lipoproteins

In accordance with the system shown in FIG. 1, a solution containing lipoproteins (injection sample) was introduced into the separation column and then lipoproteins were separated by flowing mobile phases through the column by a stepwise mode. Thereafter, the eluted mobile phases were introduced into the post column reaction system. In the post column reaction system, enzymatic reactions are carried out and hydrogen peroxide is quantitatively generated in response to the existing amount of cholesterol. Homovanillic acid was enzymatically converted into a fluorescent product by hydrogen peroxide and then detected by a fluorometric detector.

An example of the lipoproteins separation method is describe in the following.

In this connection, all of the test columns were used under the same conditions excluding the stepwise condition.
Conditions:
Test columns: A 0.27 g (dry weight) portion of each of the ion exchangers synthesized in Examples 1 and 2 and Comparative Example 1 was used by packing it in a stainless steel column having an inner diameter of 4.6 mm and a length of 35 mm by a wet method.
Mobile phases: The following two mobile phases were used.
  Solution A=20 mM sodium phosphate buffer+1 mM EDTA-2Na (pH 7.0)
  Solution B=0.5 M sodium chloride+1 mM EDTA 2Na
Stepwise mode:
  At a lapse of time of 2.5 min, 5.0 min and 7.5 min after injection of each sample, separation was carried out by increasing ratio of the solution B to values corresponding to each column.
Enzyme Solution:
  (1) Enzymes
  Cholesterol ester hydrolase (mfd. by TOYOBO, *Pseudomonas*) 59 U/l
  Cholesterol oxidase (mfd. by TOYOBO, *Streptomyces*) 24 U/l
  Peroxidase (mfd. by TOYOBO, Horseradish) 2,630 U/l
  (2) Fluorescent reagent: homovanillic acid 50 mg/l Fluorescence generation reaction auxiliary: 0.1 M NaOH
Post Column reaction Vessels:
  Enzymatic reaction vessel=3.9 ml (uses Teflon (registered trademark) tube)
  Fluorescence generation reaction vessel=0.098 ml (uses Teflon (registered trademark) tube)
Injection sample: Human plasma was diluted with 10 volumes of phosphate buffered saline (PBS) solution and a 20 μl portion thereof was injected.
In this connection, regarding the human plasma, collected human blood was mixed with 1 mg/ml in final concentration of ethylenediaminetetraacetic acid-2Na and centrifuged at 1,500 g for 10 minutes, and the thus separated plasma was used.

Post column reaction temperature: 45° C. (enzymatic reaction vessel)

Fluorometric detector: excitation wavelength=325 nm emission wavelength=420 nm

Column temperature: 25° C. (ion exchanger packed column)

Flow rate of mobile phases: 1.0 ml/min (solution A+solution B)

Flow rate of enzyme solution: 0.5 ml/min

Flow rate of fluorescence generation reaction auxiliary: 0.5 ml/min

Results:

Table 1 shows sodium chloride concentration in the mobile phase flowing into each test column, necessary for eluting high density lipoprotein (HDL) and low density lipoprotein (LDL).

TABLE 1

| | Surface addition reaction compound C Added amount % | Ion exchange capacity Milli-equivalent/g | Sodium chloride concentration for HDL elution Mol/l | Sodium chloride concentration for LDL elution mol/l | LDL/HDL Sodium chloride concentration ratio |
|---|---|---|---|---|---|
| Example 1 | 13.8 | 0.04 | 0.100 | 0.175 | 1.75 |
| Example 2 | 25.7 | 0.09 | 0.125 | 0.225 | 1.80 |
| Comparative Example 1 | 13.8 | 0.33 | 0.135 | 0.200 | 1.48 |

In the above Table 1, the sodium chloride concentration was shown by a value at the column inlet of the mobile phase, by calculating it from the stepwise supplying ratios of the solution A and solution B and the volume in the tubing.

The ion exchangers produced in Examples 1 and 2 were so-called ion exchangers having good elution performance, by which HDL is eluted at a low sodium chloride concentration. In addition, since the sodium chloride concentration at the time of the elution of LDL was high, separation of HDL peak and LDL peak was excellent.

Figure 2:
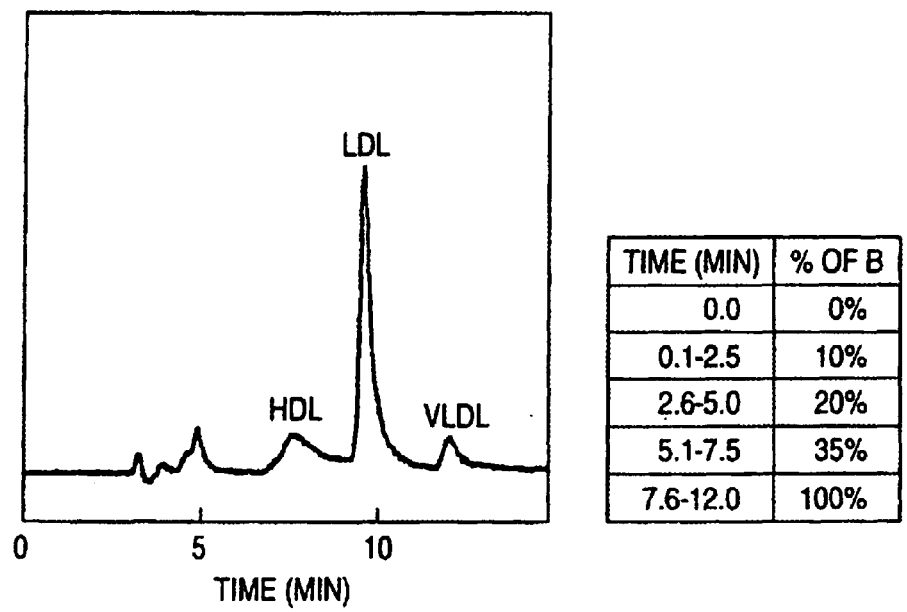
FIG. 2 is a chromatogram showing a separation result of human plasma, obtained using a column packed with the ion exchanger of Example 1.
Figure 3:
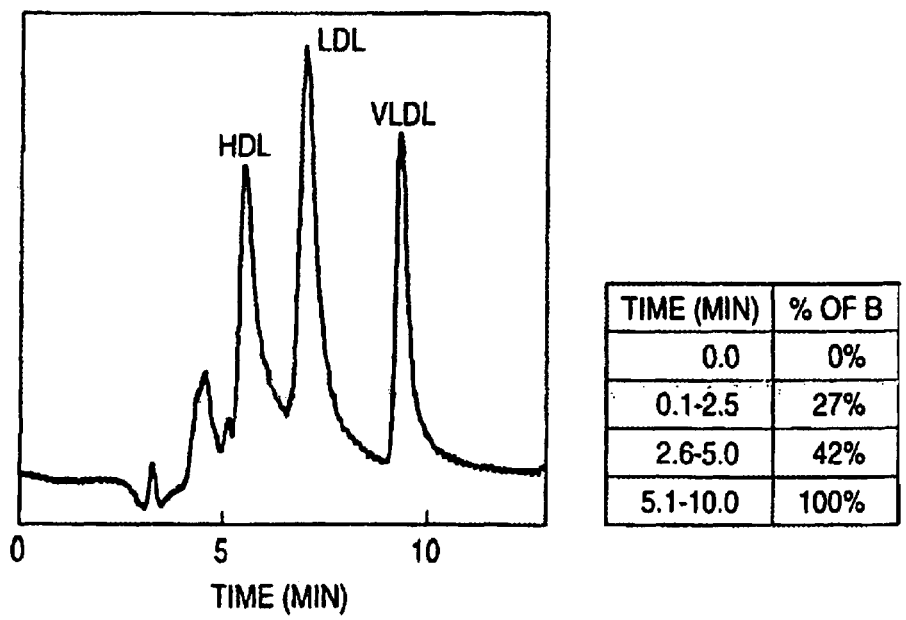
FIG. 3 is a chromatogram showing a separation result of human plasma, obtained using a column packed with the ion exchanger of Comparative Example 1.

Chromatograms showing results of carrying out separation of human plasma by test columns using the ion exchangers of Example 1 and Comparative Example 1 are shown in FIG. 2 and FIG. 3.

In addition, when separation of lipoproteins was carried out in the same manner as in the aforementioned Test Example using the anion exchanger synthesized in Example 3, almost the same result as the case of the anion exchanger of Example 2 was obtained and a normal chromatogram was obtained.

It can be understood that high density lipoprotein (HDL), low density lipoprotein (LDL) and very low-density lipoprotein (VLDL) can be separated with markedly high accuracy by the use of the ion exchanger of the invention.

EXAMPLE 4

Figure 4:
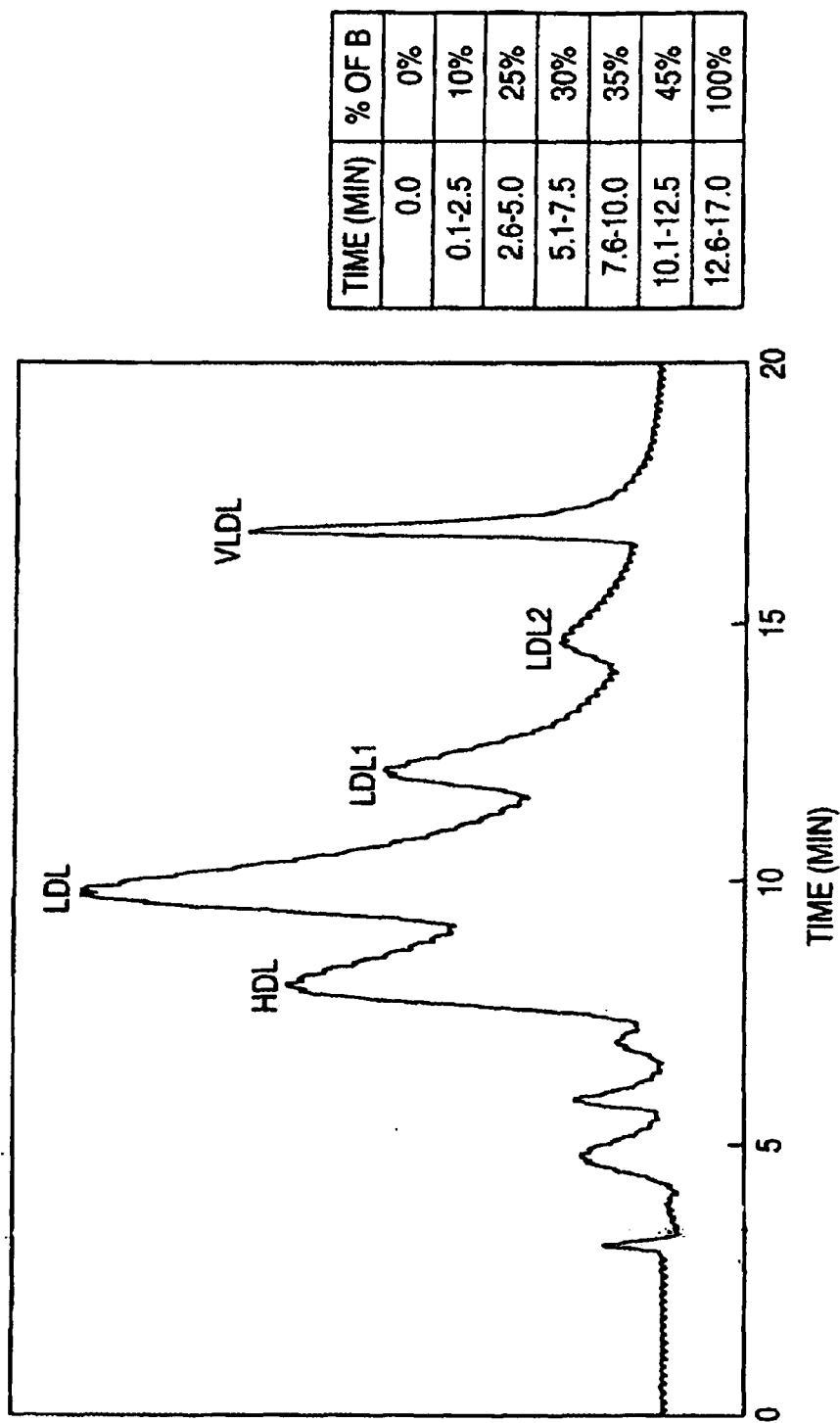
FIG. 4 is a chromatogram showing a separation result of human plasma, obtained using a column packed with the ion exchanger of Example 2.

Separation of lipoproteins was carried out in the same manner as in Example 2, except that the ratio of solution B in the stepwise mode was changed. A chromatogram showing the result is shown in FIG. 4. The LDL1 and LDL2 in FIG. 4 represent oxidized modified LDL molecules, and LDL1 and LDL2 have different degree of oxidation. It can be seen that oxidized modified LDL molecules can be separated highly accurately by the use of the ion exchanger of the invention.

While the invention has been described in detail and with reference to specific embodiments thereof, it will be apparent to one skilled in the art that various changes and modifications can be made therein without departing from the spirit and scope thereof.

This application is based on Japanese patent applications N. 2002-109036 filed on Apr. 11, 2002 and No. 2002-195178 filed on Jul. 3, 2002, the entire contents thereof being hereby incorporated by reference.

What is claimed is:

1. An ion exchanger obtained by:
   subjecting the surface of porous organic polymer particles (A) to hydrophilic treatment, wherein said hydrophilic treatment is carried out by:
   allowing the porous organic polymer particles (A) to undergo an addition reaction with a compound (B) having a cyclic ether group, a hydrophilic group or both of them and a polymerizable unsaturated double bond and then to undergo copolymerization with a polymerizable vinyl monomer (C) having a cyclic ether group, a hydrophilic group or both of them, thus forming particles (D) having a hydrophilic surface; and
   introducing an amount of an ion exchange group into hydrophilic-surface porous organic polymer particles (D) to form an ion exchanger, which has an ion exchange capacity of 0.15 milliequivalent or less per 1 g of dry ion exchanger;
   wherein the introduced amount of the compound (B) is from 0.1 to 45% by weight based on the porous organic polymer particles (A), and
   wherein the copolymerized amount of the compound (C) is from 5 to 60% by weight based on the addition product obtained by allowing the porous organic polymer particles (A) to carry out the addition reaction with the compound (B).

2. The ion exchanger of claim 1, wherein the ion exchange capacity is less than 0.12 milliequivalent per 1 g of dry ion exchanger.

3. The ion exchanger of claim 1, wherein the ion exchange capacity is 0.001 milliequivalent or more per 1 g of dry ion exchanger.

4. The ion exchanger of claim 1, wherein the introduced amount of compound (B) is from 5 to 20% by weight based on the porous organic polymer particles (A).

5. The ion exchanger of claim 1, wherein the copolymerized amount of the compound (C) is from 5 to 30% by weight based on the addition product obtained by allowing the porous organic polymer particles (A) to carry out the addition reaction with the compound (B).

6. The ion exchanger of claim 1, wherein the ion exchange group of said ion exchanger is an anion exchange group.

7. The ion exchanger of claim 1, wherein the porous, organic polymer particles (A) are water-insoluble and hydrophilic porous particles.

8. The ion exchanger of claim 1, wherein the porous organic polymer particles (A) contain from 0 to 90% by weight of a unit derived from a monovinyl monomer and from 10 to 100% by weight of a unit derived from a crosslinking polyvinyl monomer, and at least one of either the unit derived from a monovinyl monomer and unit derived from a crosslinking polyvinyl monomer has a hydrophilic group.

9. A column packed with the ion exchanger of claim 1.

10. A method for separating lipoproteins, comprising:
    contacting a solution containing one or more lipoprotein(s) with the ion exchanger of claim 1, and eluting the lipoproteins.

11. The method of claim 10, wherein said solution contains at least one high density lipoprotein, low density lipoprotein, very low-density lipoprotein or modified lipoprotein.

12. The method of claim 11, wherein said solution contains at least one modified lipoprotein which is an oxidized modified low density lipoprotein.

13. The method of claim 10, wherein the eluted lipoprotein(s) are contacted with an enzyme and detected by a fluorescence detection method.

14. The method of claim 10, which comprises applying a solution containing lipoprotein(s) to a column packed with said ion-exchanger and then applying a mobile phase containing sodium chloride to the column in a stepwise or gradient mode, wherein the high density lipoprotein is eluted from the column and detected as a peak when concentration of sodium chloride in the mobile phase flowing into the column is 0.13 mol/l or less, and low density lipoprotein is eluted when concentration of sodium chloride in said mobile phase is 1.6 times or more than said concentration at the time of high density lipoprotein elution.

15. The ion exchanger of claim 1, wherein the average pore diameter of particles (A) ranges from 1 to 200 nm.

16. The ion exchanger of claim 1, wherein the average pore diameter of particles (A) ranges from 7.5 to 150 nm.

17. The ion exchanger of claim 1, wherein the pore volume of particles (A) ranges from 0.2 to 1.8 ml/g.

18. The ion exchanger of claim 1, wherein the specific surface area of particles (A) ranges from 1 to 1,000 $m^2$/gr.

19. The ion exchanger of claim 1, wherein compound (B) is at least one of 3,4epoxy-1-butene, 4,5-epoxy-3-oxo-1-pentene, vinyl glycidyl ether, allyl glycidyl ether, glycidyl (meth)acrylate, or tetrahydrofurfuryl (meth)acrylate.

20. The ion exchanger of claim 1, wherein compound (C) is at least one compound selected from the group consisting of unsaturated carboxylic acid, (meth)acrylic acid ester, (meth)acrylamide, vinyl ester, allyl alcohol, allyl ester, allylamine, and vinylamine; wherein said compound is polymerizable and has a cyclic ether group and/or a hydrophilic group.

* * * * *